(12) United States Patent
Sidhu et al.

(10) Patent No.: US 9,902,331 B2
(45) Date of Patent: Feb. 27, 2018

(54) COMPARTMENT WITH STOWABLE ACCESSORY HOLDER

(71) Applicant: NYX, Inc., Livonia, MI (US)

(72) Inventors: Gurpreet S. Sidhu, Canton, MI (US); Jeffrey Michael Bisson, Amherstburg (CA)

(73) Assignee: NYX, Inc., Livonia, MI (US)

( * ) Notice: Subject to any disclaimer, the term of this patent is extended or adjusted under 35 U.S.C. 154(b) by 213 days.

(21) Appl. No.: 14/279,757

(22) Filed: May 16, 2014

(65) Prior Publication Data

US 2015/0115639 A1    Apr. 30, 2015

Related U.S. Application Data

(60) Provisional application No. 61/898,002, filed on Oct. 31, 2013.

(51) Int. Cl.
*B60R 7/08* (2006.01)
*B60R 7/04* (2006.01)

(52) U.S. Cl.
CPC ..................................... *B60R 7/04* (2013.01)

(58) Field of Classification Search
CPC ...... B60N 2/4686; B60N 2/4646; B60N 3/10; B60N 2/4606; B60N 3/101; B60N 3/102; B60K 2350/925
USPC ........... 296/37.8, 1.09, 24.34, 37.1; 224/539, 224/553, 929, 275, 281; 297/188.16, 297/188.19
See application file for complete search history.

(56) References Cited

U.S. PATENT DOCUMENTS

| | | | |
|---|---|---|---|
| 4,509,097 A * | 4/1985 | Robinson | B60R 11/0264 297/188.14 |
| 5,524,050 A | 6/1996 | Boerema et al. | |
| 5,556,017 A * | 9/1996 | Troy | B60R 11/0241 224/275 |
| 5,820,094 A * | 10/1998 | Tanaka | B60N 3/102 224/282 |
| 5,836,496 A | 11/1998 | Levin et al. | |
| 5,853,220 A | 12/1998 | Gulich et al. | |
| 5,996,866 A | 12/1999 | Susko et al. | |
| 6,168,059 B1 * | 1/2001 | Salenbauch | B60R 7/04 220/345.5 |
| 6,616,205 B2 | 9/2003 | Bruhnke et al. | |
| 6,616,206 B2 | 9/2003 | Luginbill | |
| 6,789,831 B2 * | 9/2004 | Schmidt | B60K 37/06 296/37.12 |
| 6,929,304 B1 | 8/2005 | Dry et al. | |
| 7,188,882 B2 | 3/2007 | Dry | |
| 7,413,229 B2 | 8/2008 | Kukucka et al. | |
| 7,623,958 B1 * | 11/2009 | Laverick | B60R 11/0258 361/679.01 |

(Continued)

*Primary Examiner* — Glenn Dayoan
*Assistant Examiner* — Sunsurraye Westbrook
(74) *Attorney, Agent, or Firm* — Carlson, Gaskey & Olds, P.C.

(57) ABSTRACT

A stowable accessory holder includes a compartment and a door rotatably mounted with respect to the compartment. The door is rotatable between a first, stowed position in which a side of the door faces into the compartment and a second, accessible position in which the side faces outwards from the compartment. At least one resilient retainer on the door is configured to retain an object on the door.

18 Claims, 3 Drawing Sheets

(56) References Cited

U.S. PATENT DOCUMENTS

| | | | |
|---|---|---|---|
| 8,033,588 B2 * | 10/2011 | Luginbill | B60R 7/04 296/24.34 |
| 2003/0155786 A1 * | 8/2003 | Kim | B60R 7/04 296/24.34 |
| 2013/0112831 A1 * | 5/2013 | Kong | B60N 2/4686 248/311.2 |
| 2015/0244127 A1 * | 8/2015 | Kim | B60N 3/14 439/34 |

* cited by examiner

COMPARTMENT WITH STOWABLE ACCESSORY HOLDER

CROSS REFERENCE TO RELATED APPLICATION

This application claims priority to U.S. Provisional Patent Application No. 61/898,002 filed on Oct. 31, 2013.

BACKGROUND

This disclosure relates to a compartment with a swingable door. For example, vehicle passengers may store objects, such as mobile devices, in various compartments in the vehicle interior. However, the objects may not be easily accessible and may move around in the compartment during movement of the vehicle.

SUMMARY

A stowable accessory holder according to an example of the present disclosure includes a compartment, and a door rotatably mounted with respect to the compartment. The door is rotatable between a first, stowed position in which a side of the door faces into the compartment and a second, accessible position in which the side faces outwards from the compartment. At least one resilient retainer on the door is configured to retain an object on the door.

A console with a stowable accessory holder according to an example of the present disclosure includes a console body including a compartment extending between first and second opposed sides, and a bottom joining the first and second opposed sides. The first and second opposed sides include, respectively, first and second resilient clips. A door extends between first and second opposed edges. The door is rotatably mounted with respect to the compartment. The door is rotatable between a first, stowed position in which a side of the door faces into the compartment and a second, accessible position in which the side faces outwards from the compartment. The first and second edges of the door are retained by the first and second resilient clips at least when the door is in the first, stowed position. At least one resilient retainer on the door, is configured to retain an object on the door.

An article for a stowable accessory holder according to an example of the present disclosure includes a door extending between first and second opposed edges, a pivot defining an axis about which the door is rotatable, the axis bisecting the door with respect to the first and second opposed edges, and at least one resilient retainer on the door, the resilient retainer configured to retain an object on the door.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
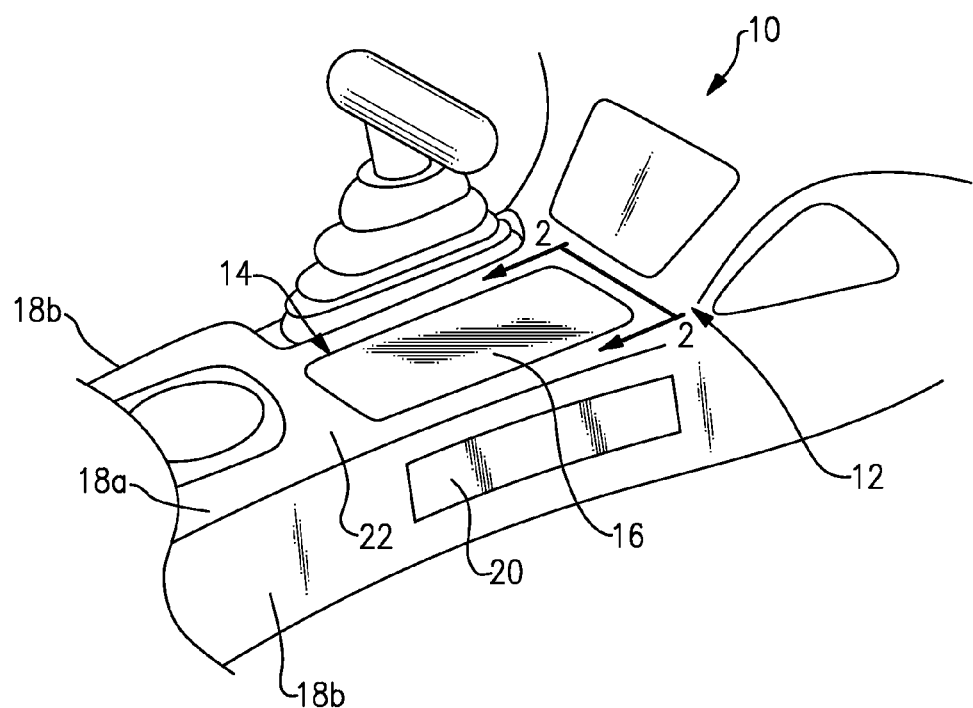
FIG. 1 illustrates a vehicle console with a stowable accessory holder.

FIG. 1 shows a console 10 that includes a stowable accessory holder 12. The accessory holder 12 can be included in a vehicle or the like for storing/holding an object in a stowed or accessible position. For example, a vehicle often has one or more compartments in which objects can be loosely stored. However, the object can be difficult to quickly locate in the compartment or can become damaged from moving around in the compartment, especially if the compartment is large. As will be described in further detail, the stowable accessory holder 12 securely holds an object, such as a mobile device, in a stowed or accessible position. In the stowed position, the stowable accessory holder 12 protects the object from physical access and securely holds the object to prevent damage. The stowed position may also shield the object from view, reducing the risk of theft. In the accessible position, the stowable accessory holder 12 allows access to the object, yet securely holds the object such that it does not move around or become damaged.

The stowable accessory holder 12 includes a compartment 14 and a door 16 rotatably mounted with respect to the compartment 14. In the example of FIG. 1, the console 10 includes a console body 22 that has a top face 18a and side faces 18b. In this example, the door is 16 located on the top face 18a. The compartment 14 may alternatively be located on one of the sides 18b, as represented at 20.

Figure 2:
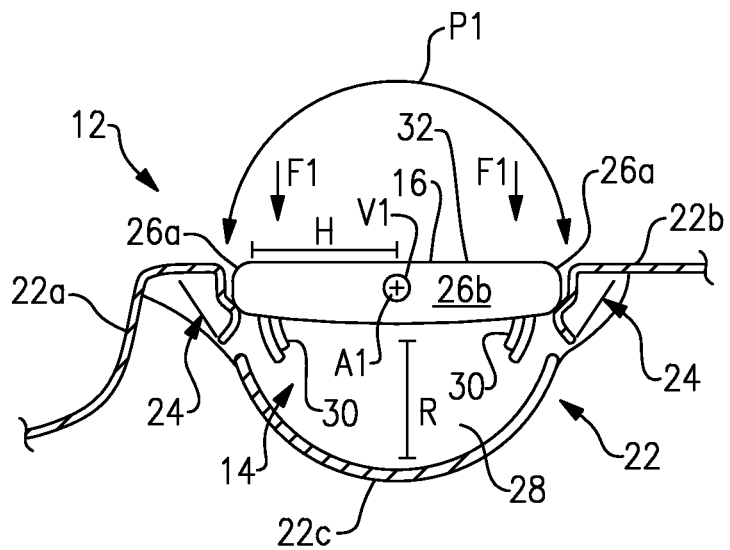
FIG. 2 illustrates a cross-sectional view of the stowable accessory holder of FIG. 1.

FIG. 2 shows a cross-section of the compartment 14 along the line 2-2 (FIG. 1) with the door 16 in a stowed position. The door 16 is rotatable along a path P1 about a pivot V1 defining an axis A1. The compartment 14 extends between sides 22a and 22b of the console body 22. Each of sides 22a and 22b includes a resilient clip 24. The resilient clips 24 secure the door 16 flush with the top 18a of the console body 22 when the door 16 is in a stowed position by interacting with edges 26a of the door 16. The resiliency of the clips 24 allows the door 16 to rotate about axis A1 upon application of a downward force F1 applied to either side of the door 16 (along the path P1 and perpendicular to the door 16) adjacent to either of the clips 24. Because the axis A1 is situated towards the center of the door 16, the edges 26b of the door 16 rotate freely. In this example, the axis A1 bisects the door 16 with respect to the edges 26b of the door 16.

The bottom 22c of the compartment 14 is located under the door 16 in this example and joins the sides 22a, 22b to form an interior 28. In one example, the bottom 22c is of a size and shape configured to accommodate 360° rotation of the door 16 about the axis A1. For instance, the geometry of the bottom 22c correspond to the shape of the path P1. In this example, the bottom 22c is semicircular and has a radius R that is greater than a half-length H of the door 16.

Figure 3:
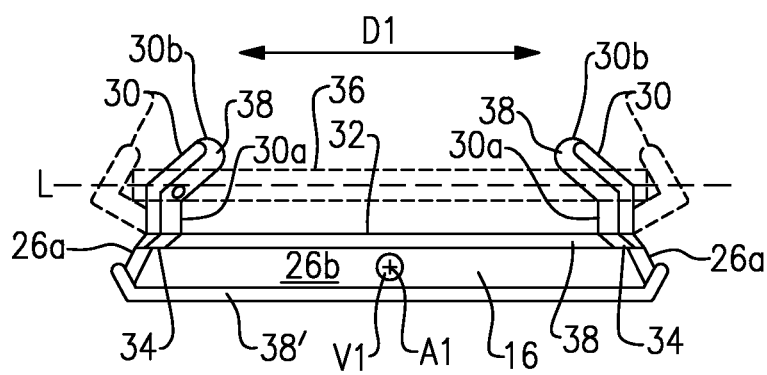
FIG. 3 illustrates an isolated view of the door of the stowable accessory holder of FIG. 1.

FIG. 3 illustrates an isolated view of the door 16. The door 16 includes resilient retainers 30 on one side 32 of the door 16. The resilient retainers 30 and/or the door 16 can be made of a polymeric material. The resilient retainers 30 are configured to retain an object 36 (shown in phantom), such as a mobile device, on the door 16. In the example, the object 36 is generally rectangular, however, the door 16 can be adapted to retain objects of other shapes.

The resilient retainers 30 are movable in a direction D1 towards and away from one another to accommodate and secure the object 36 between them. The direction D1 is perpendicular to the axis A1. In a further example, the resilient retainers 30 can include a spring mechanism 34 that allows for movement in the direction D1 and biasing of the resilient retainers 30 against the object 36. In the example of FIG. 3, the door 16 includes two resilient retainers 30, however, additional resilient retainers may be used.

The resilient retainers 30 are elongated fingers and each include a first portion 30a extending generally perpendicular to the door and a second, lip portion 30b that extends from the first portion 30a. The lip portion 30b catches and retains the object 36 on the door 16.

The door 16 and/or the resilient retainers 30 can also include a layer 38 to cushion the object 36 and reduce damage. The layer 38 can be, for example, a polymeric material, such as a thermoplastic elastomer (TPE), a foam, or the like. The door 16 and/or the resilient retainers 30 with layer 38 can be made with a two-shot molding process, but are not limited to such a process.

Figure 4:
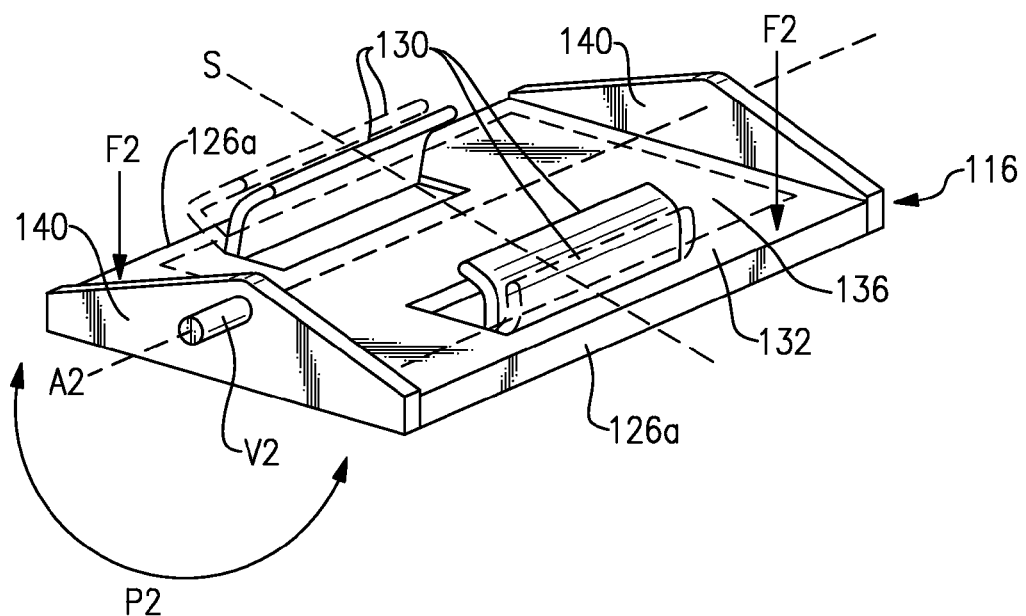
FIG. 4 illustrates another example of a door of a stowable accessory holder.

FIG. 4 illustrates an isolated view of another example door 116 that can be rotatably mounted with respect to the compartment 14 (FIG. 1). In this disclosure, like reference numerals designate like elements where appropriate and reference numerals with the addition of one-hundred or multiples thereof designate modified elements that are understood to incorporate the same features and benefits of the corresponding elements. The door 116 includes endwalls 140 and resilient retainers 130 arranged perpendicular to the endwalls 140. The resilient retainers 130 are movable towards and away from one another in a direction D2, which is perpendicular to an axis A2, to secure object 136. The door 116 is rotatable along the path P2 about a pivot V2 defining the axis A2. The axis A2 bisects the door 116 with respect to edges 126a.

When an object such as a mobile device 36, 136 is secured in the resilient retainers 30, 130, the object 36, 136 is exposed and accessible (FIGS. 3 and 4). That is, the side 32, 132 of the door 16, 116 faces outwards from the compartment 14. Upon rotation of the door 16, 116 180° about respective axes A1, A2 to a stowed position (FIG. 2), the object 36, 136 is hidden and inaccessible. That is, the side 32, 132 of the door 16, 116 with the resilient retainers 30, 130 faces into the compartment 14.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A stowable accessory holder, comprising:
    a compartment;
    a door rotatably mounted with respect to the compartment, the door being rotatable between a first, stowed position in which a side of the door faces into the compartment and a second, accessible position in which the side faces outwards from the compartment, wherein the door extends between first and second opposed edges, with a pivot defining an axis about which the door is rotatable, the axis bisecting the door with respect to the first and second opposed edges; and
    at least one resilient retainer on the door, the resilient retainer configured to retain an object on the door such that the door and the object are rotatable in unison with respect to the compartment.

2. The stowable accessory holder as recited in claim 1, wherein the door extends between first and second opposed edges, and the at least one resilient retainer comprises a first finger and a second finger adjacent to the first and second edges of the door, respectively.

3. The stowable accessory holder as recited in claim 2, wherein the first and second fingers each include a first portion extending perpendicular to the door and a lip portion extending from the first portion and configured to catch the object.

4. The stowable accessory holder as recited in claim 1, wherein the at least one resilient retainer is movable in a direction perpendicular to an axis of rotation of the door.

5. The stowable accessory holder as recited in claim 1, wherein the at least one resilient retainer is resiliently biased against the object via a spring mechanism.

6. The stowable accessory holder as recited in claim 1, wherein the door is rotatable 360° about the axis.

7. A console with a stowable accessory holder, comprising:
    a console body including a compartment extending between first and second opposed sides, and a bottom joining the first and second opposed sides, the first and second opposed sides including, respectively, first and second resilient clips;
    a door extending between first and second opposed edges, the door rotatably mounted with respect to the compartment, the door being rotatable between a first, stowed position in which a side of the door faces into the compartment and a second, accessible position in which the side faces outwards from the compartment, the first and second edges of the door being retained by the first and second resilient clips at least when the door is in the first, stowed position, and wherein the door extends between first and second opposed edges, with a pivot defining an axis about which the door is rotatable, the axis bisecting the door with respect to the first and second opposed edges; and
    at least one resilient retainer on the door, the resilient retainer configured to retain an object on the door such that the door and the object are rotatable in unison with respect to the compartment.

8. The console as recited in claim 7, wherein the bottom of the console body is semicircular, and has a radius greater than a half-length of the door.

9. The console as recited in claim 7, wherein the door is rotatable by a downward force on the door adjacent to one of the first and second edges.

10. The console as recited in claim 7, wherein the door is rotatable 180° about the axis between the first position and the second position.

11. An article for a stowable accessory holder, comprising:
    a door extending between first and second opposed edges;
    a pivot defining an axis about which the door is rotatable, the axis bisecting the door with respect to the first and second opposed edges; and
    at least one resilient retainer on the door, the resilient retainer configured to retain an object on the door such that the door and the object are rotatable in unison with respect to the compartment.

12. The article as recited in claim 11, wherein at least one of the door and the at least one resilient retainer is formed of polymer.

13. The article as recited in claim 11, wherein at least one of the door and the at least one resilient retainer includes a cushion layer.

14. The article as recited in claim 13, wherein the cushion layer includes at least one of a foam and a thermoplastic elastomer.

15. The article as recited in claim 11, wherein the at least one resilient retainer comprises a first finger and a second finger adjacent to the first and second edges of the door, respectively.

16. The article as recited in claim 15, wherein the first and second fingers each include a first portion extending generally perpendicular to the door and a lip portion extending from the first portion and configured to catch the object.

17. The stowable accessory holder as recited in claim 1, wherein the axis is a first axis, and is through the center of the door with respect to the first and second opposed edges, and wherein the door is longer along the first axis than along a second axis perpendicular to the first axis.

18. The stowable accessory holder as recited in claim 1, wherein the resilient retainers are movable.

\* \* \* \* \*